US005643478A

United States Patent [19]
Dillet et al.

[11] Patent Number: 5,643,478
[45] Date of Patent: Jul. 1, 1997

[54] COMPUTER-ASSISTED WELDING PROCESS AND SYSTEM, BASED ON A VIEW OF THE WELDING SCENE

[75] Inventors: Alain Dillet, Puteaux; Diane de Prunele, Paris, both of France

[73] Assignee: Commissariat a l'Energie Atomique, Paris, France

[21] Appl. No.: 415,573

[22] Filed: Mar. 31, 1995

Related U.S. Application Data

[63] Continuation of Ser. No. 904,653, Jun. 26, 1992, abandoned.

[30] Foreign Application Priority Data

Jun. 28, 1991 [FR] France ................... 91 08105

[51] Int. Cl.$^6$ .................................................. B23K 9/095
[52] U.S. Cl. ................................................ 219/130.21
[58] Field of Search ........................... 219/124.34, 130.21

[56] References Cited

U.S. PATENT DOCUMENTS

| | | | |
|---|---|---|---|
| 4,144,992 | 3/1979 | Omae et al. | 219/125.11 |
| 4,567,348 | 1/1986 | Smith et al. | |
| 4,611,111 | 9/1986 | Baheti et al. | 219/124.34 |
| 4,613,743 | 9/1986 | Nied et al. | 219/124.34 |
| 4,698,484 | 10/1987 | Babcock et al. | 219/130.01 |
| 4,877,940 | 10/1989 | Bangs et al. | 219/124.34 |

FOREIGN PATENT DOCUMENTS

| | | | |
|---|---|---|---|
| 3545158 | 6/1987 | Germany. | |
| 2-70384 | 3/1990 | Japan | 219/137 R |

OTHER PUBLICATIONS

Soudage et Techniques Connexes, May–Jun. 1989, pp. 25–29, J.L. Breat, "Cellule Robotisee de Soudage Avec Adaptativite En Temps Reel des Parametres de Soudage".
Patent Abstracts of Japan, vol. 7, No. 261, (M-257) [1406], Nov. 19, 1983, & JP-A-58-141864, Aug. 23, 1983, K. Honda, et al., "Automatic Welding".

*Primary Examiner*—Clifford C. Shaw
*Attorney, Agent, or Firm*—Oblon, Spivak, McClelland, Maier & Neustadt, P.C.

[57] ABSTRACT

Computer-assisted welding process and system, based on a view of the welding scene. This invention relates to a computer-assisted welding process and system. This automatic welding process, assuring the processing of images taken during a welding scene, is based on a learning from the welding cases already processed. It comprises the operations for prior establishment of relationships between the parameters of welding; of installation, in hardware or software form, of these relationships in a welding system, then the execution by this system; of pictures of a welding scene in progress; of analysis of each of these pictures to measure certain of the welding parameters; of evaluation, from these relationships, of values for correction of the welding parameters; of intervention, as a function of this evaluation on the welding in progress. This process is used by a system having a welding head able to take the pictures, and a processing and control unit able to apply said process. This finds numerous applications all high-technology industrial fields, such as the aeronautics and nuclear fields.

17 Claims, 4 Drawing Sheets

COMPUTER-ASSISTED WELDING PROCESS AND SYSTEM, BASED ON A VIEW OF THE WELDING SCENE

This application is a Continuation of application Ser. No. 07/904,653, filed on Jun. 26, 1992, now abandoned.

BACKGROUND OF THE INVENTION

This invention relates to an automatic welding process and its computer-assisted welding system. This computer-assisted welding system, or CAW system, makes it possible to control the welding process in real time.

The invention finds its applications in many fields and, more particularly, in the so-called "high technology" industries, such as the nuclear, aeronautics, space and farm-produce fields.

Today, most welding operations require the continual proximity of a human operator to face unexpected conditions. Actually, in production operation, the welding conditions are rarely totally constant; they generally exhibit random and unforeseen disturbances, such as deformations, irregularities, deviations of position, etc. These disturbances often have unfortunate consequences on the quality of the welding.

However, automatic welding devices exist that take into account certain of these disturbances. These devices are listed in a work titled "Robots de soudage, capteurs et adaptativité de trajectoire" ["Welding Robots, Sensors and Path Adaptivity"], published in 1988 by HERMES publishers, under the signature of J. M. DETRICHE.

Most of these devices exist in the form of sensors retrofitted to previously existing installations. Thus, most of these devices assure checking only of a single function of the welding process, this function very often being the tracking of the welding joint.

This invention makes it possible precisely to control a large part of the functions of the welding process, and this in real time.

The welding process according to the invention assures a self-checking of the CAW system, which consequently makes it possible to perform welds under conditions that cannot be controlled by a human operator (speed, precision, efficiency) in a hostile environment.

The CAW system according to the invention comprises in particular a welding head which comprises a device for imaging the welding scene in progress. The images thus obtained are processed in real time by a processing and control means (for example, a computer) so as to deduce from them the values of the possible corrections to be made to the system to obtain an even, quality weld. This system uses an automatic welding process based on a learning from the welding cases already processed.

More specifically, the CAW welding process consists in a first stage of prior establishment of a methodical and quantitative knowledge of the laws of behavior of the material during a welding operation. This knowledge is expressed by relationships between the various welding parameters.

According to the invention, the relationships comprise relationships connecting a measured parameter with a result parameter, as well as relationships connecting a result parameter with a controllable parameter.

These three parameters interact, each result parameter being subject to an appropriate constant value, by correction of the controllable parameter from the determination of the measured parameter.

Advantageously, the establishment of these relationships consists in establishing a data base from triplets of parameters each comprising a measured parameter, a controllable parameter and a result parameter.

These relationships can comprise, among others, and for different welding conditions, relationships between the welding current and the length of the molten bath in operation and the geometric parameters of the resultant welding bead.

In the same way, they can also comprise relationships between the welding current and the contour of the molten bath in operation and the geometric parameters of the resultant bead.

The relationships necessary for the slaved operation of the CAW system are then installed in said system, either in software form, or in hardware form.

During the physical production of a weld in CAW mode, the CAW process consists in carrying out a second stage comprising the following operations:

a) taking of pictures of a welding scene in progress;
b) analysis of this picture-taking to measure the necessary parameters;
c) calculation, from these measurements and from said relationships reinstalled in the system, of the correction values to be made to the welding parameters during the execution of the welding;
d) intervention on the welding parameters.

Advantageously, it comprises between operations (a) and (b) a dialog operation with a user assuring a choice of automatic execution or interactive execution of operations (b) to (d).

For a continuous checking of the welding, operations (a) to (d) are continuously repeated as long as an interrupt order has not been received. This interrupt order is given by the user during the interactive dialog operation.

Moreover, picture-taking operation (a) is optionally followed by an operation of storing said pictures on a video recorder, for example.

In ordinary operation, picture-taking operation (a) consists in taking said pictures in a continuous mode. However, in the case of selecting interactive execution, the user can also give the order to take said pictures in a shot-by-shot mode, for parametering needs for example.

Such a process can be applied in a CAW system. The system using this process comprises:

a welding head;
a carrier (or, more precisely, a welding bench) to which the welding head is fastened;
means for supplying the head with voltage;
a processing and control unit (PCU) connected to the welding head and to the bench.

This system is characterized by the fact that:

the welding head comprises means for taking pictures of the welding scene;
the welding bench is able to be moved relative to the welding scene; and
the processing and control unit (PCU) comprises a central processing unit (CPU), means for analyzing the pictures and means for controlling the power supply means and the welding bench.

Advantageously, the processing and control unit further comprises means for displaying the images and means for storing said images, located upstream from the analysis means.

Moreover, the means for analyzing the images of the welding scene comprises an image acquisition card installed in the CPU, this card being connected to the means for displaying the images and to the means for storing the images.

According to the invention, the central processing unit comprises input/output interface cards able to establish connections between the CPU and the welding bench, between the CPU and the power supply means and between the CPU and the welding head.

More particularly, the voltage supply means comprises a welding generator comprising two inputs, the first receiving a nominal current value and the second receiving a current value of correction to be made to said nominal current. These nominal and correction current values can be controlled from the CPU.

In addition, the system further comprises a means for regulating an arc voltage that is connected, at input, to the welding head, and, at output, to the welding bench.

BRIEF DESCRIPTION OF THE DRAWINGS

Other characteristics and advantages of the invention will come out better from the following description, given by way of illustration, but in a nonlimiting way, with reference to the drawings in which.

DETAILED DESCRIPTION OF THE DRAWINGS

Figure 1:
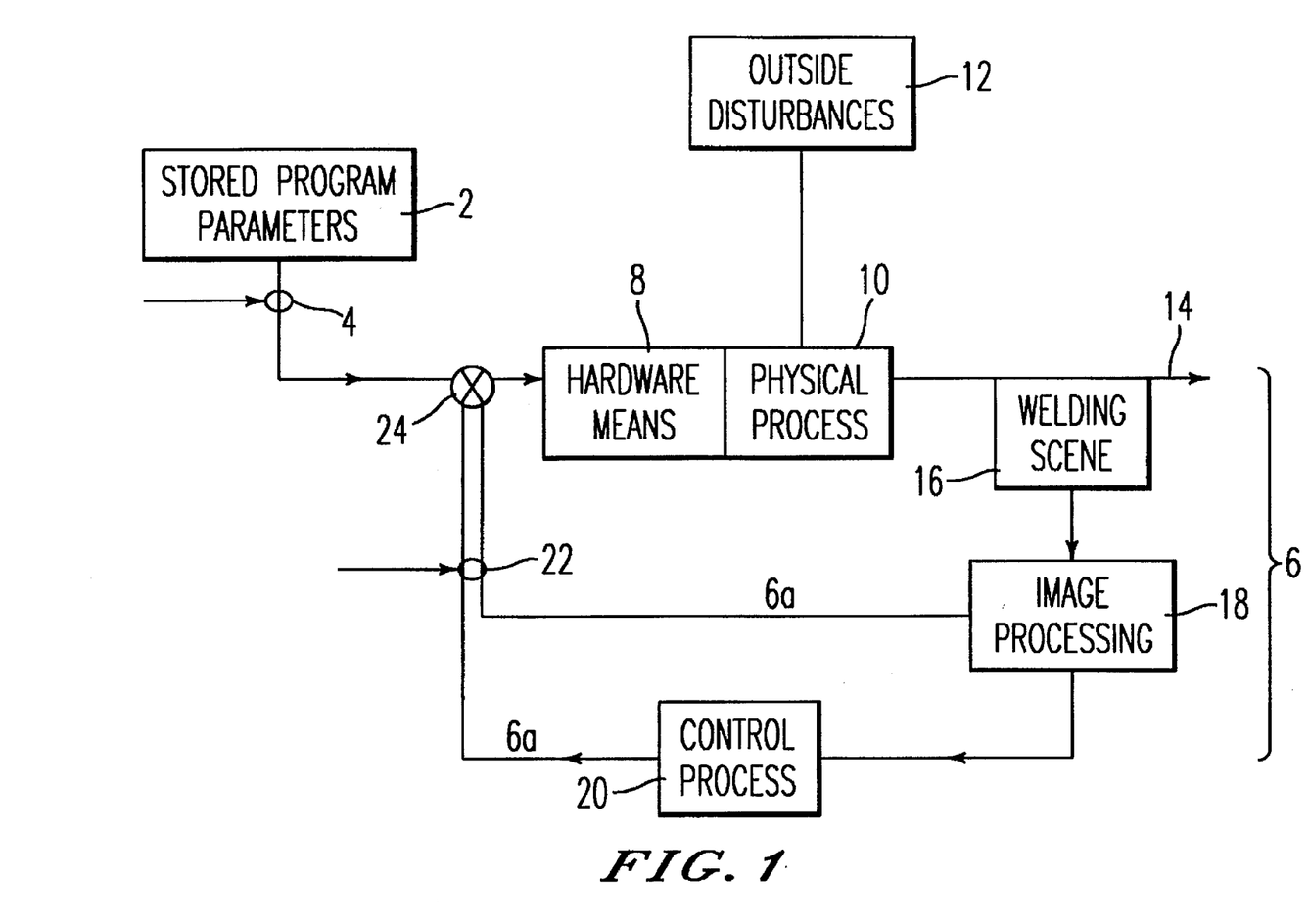
FIG. 1 represents the functional diagram of the methodology put in place in the automatic welding process according to the invention.

In FIG. 1, the functional diagram of the methodology applied in the system according to the invention has been represented. It shows a feedback loop making it possible to control the system, i.e., to correct, during execution, certain welding parameters. Interactivity in real time will also be discussed.

This feedback loop is established from data found at the welding scene; this data is processed to be used so as to correct certain welding parameters. Since the number of parameters is very large, the feedback (or inverse feedback) loop must be multivariable.

The use of such inverse feedback necessitates knowing the laws of behavior governing welding. As explained above, these laws are determined prior to the welding operations. They are determined with the CAW system in a single measurement, and are put in the form of data bases and installed in said system.

As shown in FIG. 1, programmed parameters at 2 are introduced into process loop 6 after having been initialized at set values 4.

These parameter values are applied at 8 to the hardware means for which they are intended in the CAW system. An interaction immediately occurs at 10 between the electric arc created by the welding head and the material, i.e., the parts to be welded. It is the physical process of the welding.

If the welding conditions are not perfect, i.e., consistent with predefined conditions (which is generally the case), outside disturbances 12 occur, acting on physical process 10 of the welding.

The welding scene is filmed at 16 in real time and the images obtained are processed at 18. The processing of the images makes it possible to determine data relating to the welding in progress.

Some of this data relates, more specifically, to the welding path, i.e., the tracking of the joint. This data is transformed into correction values 22 and is sent to input 24 of inverse feedback loop 6, where it is correlated with set values 4 of parameters 2: thus a path loop 6a is formed.

The other data determined at 18 makes it possible, by referring to the laws of correlation and the laws of control 20 of the process, previously determined and recorded in the data base, to deduce corrections 22 which are correlated at 24 with set values 4 of parameters 2: thus a process loop 6b is formed.

In the particular case where the laws are one-to-one and the parameters are independent, each welding parameter can be controlled by a feedback loop which is suited to it.

The welding parameters governing an arc welding process, such as TIG (tungsten-inert gas welding), are numerous, i.e., on the order of a good dozen: arc voltage, welding current, speed of the welding torch, speed of the filler wire, type of material, conditions of the surface of the parts to be welded, etc.

This invention uses a methodology to determine laws of correlation between all these welding parameters or, as a measure of simplification of the system, between the significant parameters of the welding.

According to the methodology cited above, the significant parameters are listed in three categories:

the result parameters which are significant of the result obtained after the welding;

the controllable parameters which make it possible, by modifying them, to act on the result parameters; and the measured parameters, or observable parameters, which can be measured during the welding.

The measurements of certain measured parameters make it possible to determine the characteristics (quality, etc.) of certain result parameters. It is therefore possible to determine laws of correlation between a measured parameter and a result parameter.

Moreover, the result parameters are controlled by modification of the controllable parameters. It is therefore possible to determine laws of correlation between a controllable parameter and a result parameter.

Thus, each law of correlation assures a close connection between a parameter of one category (measured, controllable, result) and a parameter of another category.

More specifically, the system is controlled by keeping the result parameters within a predefined tolerance range. These parameters are rendered almost constant by correcting the controllable parameters from the measurement of the measured parameters. These three types of parameters form a triplet of parameters.

It is possible to illustrate, by an example, what has just been described. Actually, it is possible to control the CAW system in penetration with regard to thermal disturbances, by being based on the following triplet: width in relation to the weld as result parameter, welding current as controllable parameter, and crown-location of the weld (contour location of the molten bath) as measured parameter.

This automatic control, like all automatic controls processed in the system, can be achieved when the following condition is achieved: the laws of correlation between two types of parameters are one-to-one, i.e., monotonic and with non-zero slopes.

In a more practical way, the measurement of three pieces of information, correctly selected, can make it possible, in each particular welding case, to obtain laws of correlation then to use the automatic control using these laws of correlation.

These laws of correlation are stored to constitute a data base. To establish this data base, it is necessary to choose the optimum triplet from tests, in reduced number, but strictly complying with the methodology of the system. In this way, the richer the data base is in number of applications, the faster the process will "cycle through."

This data base is in fact composed of three data bases:
- a static data base, which is established from the behavior of the process under established conditions, for different stable values of the controllable parameter, in the absence of disturbances and with the other constant parameters at nominal values;
- a dynamic data base, which is established from the behavior of the process during a transition of values of the controllable parameter (a step between two stable conditions), in the absence of disturbances and with the other constant parameters at the nominal values; and
- a disturbed data base, which is established from the behavior of the process in the presence of the disturbance that it is desired to treat, the other parameters being constant.

These three data bases make it possible to manage triplets of parameters consisting of measured parameters, controllable parameters and result parameters. The static data base therefore contains the values of the measured parameters correlated with the values of the controllable parameters and the result parameters, under established conditions, at different points of operation of the process, in a range surrounding the nominal operating point. The dynamic data base provides the values under temporary conditions of the measured parameters and the result parameters during temporary variations of the controllable parameters between different points of the static data base. The disturbed data base comprises the values of the result parameters correlated with the values of the controllable parameters and measured parameters, in the presence of the disturbance to be treated and for different points of operation.

The automatic control of these result parameters is achieved by modifying the values of the controllable parameters in accordance with the established values of the measured parameters.

Figure 2:
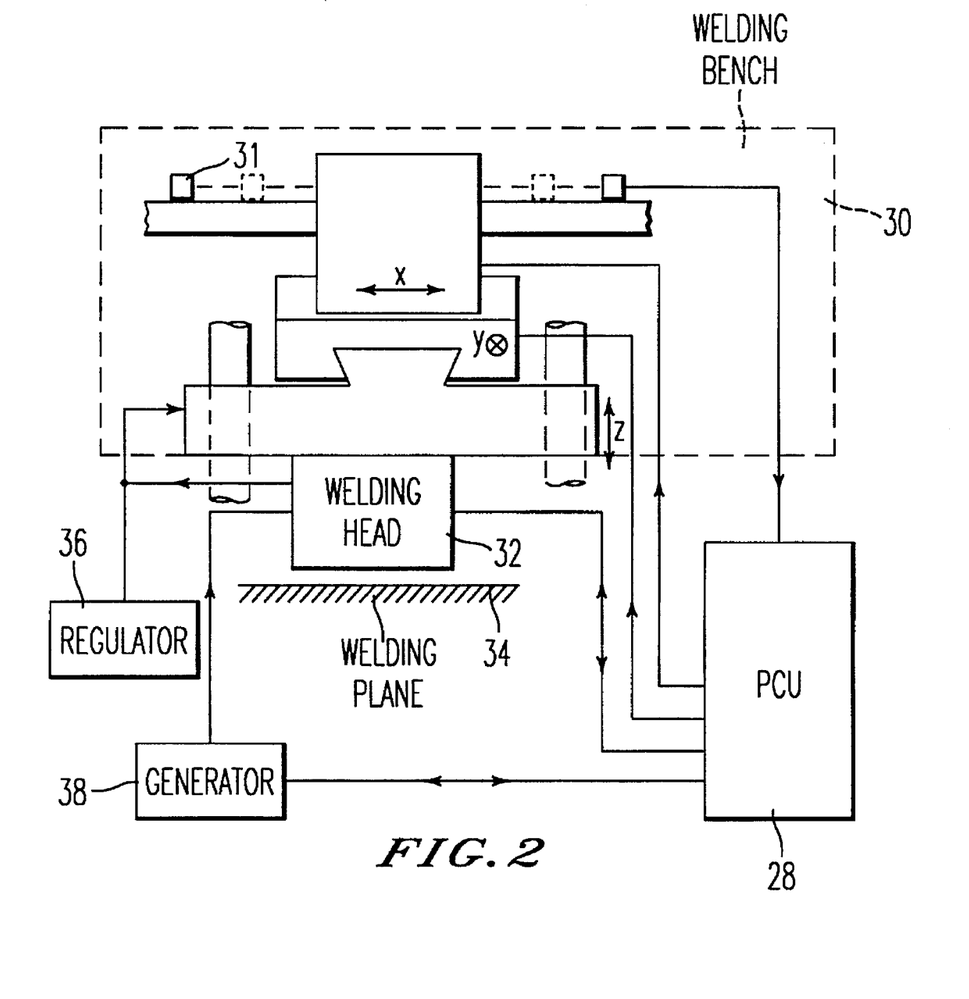
FIG. 2 represents, very diagrammatically, the means constituting the CAW system.

The measurements and processing to control the system and to establish the data bases are performed from the installation shown in a very diagrammatic way in FIG. 2.

In this figure, welding bench 30 under which welding head 32 is fastened has been represented. This welding head 32 is displaced in relation to welding plane 34, as a function of the movements of welding bench 30. Welding head 32 can thus be displaced along longitudinal axis X, crosswise axis Y and vertical axis Z.

Actually, the welding bench, of the flat Cartesian type, is controlled in speed on its crosswise axis Y, in an analog way through a variator, not shown, that can be controlled manually or from PCU 28. Vertical axis Z is connected to a device 36 for regulating the arc voltage, to control the height of welding head 32 in relation to welding plane 34, the device receiving, at input, the arc voltage value measured on welding head 32.

The movements on longitudinal axis X can be remote-controlled, in "all or nothing" mode, from PCU 28. Furthermore, electric contacts 31, or stops, have been placed on said longitudinal axis X, to supply PCU 28 with specific position data of bench 30 on this axis.

Welding head 32 is also connected to PCU 28 with which it exchanges a certain number of pieces of information in the form particularly of images.

Actually, said head 32 comprises a video camera assuring the taking of the images of the welding scene. It comprises, in addition, means to project light spots on said welding scene. The position of these spots, as well as the lighting of the welding scene by the electrode brought to high temperature and by the arc, make it possible too determine (via the pictures) certain observable parameters.

A welding generator 38 sends, on a second input of welding head 32, a welding current whose value is determined from PCU 28. An exchange of data relating to current values can therefore be established between generator 38 and PCU 28.

Generator 38 comprises two inputs, not shown. A first input, set input, assures the control of the nominal current of generator 38 (between 0 and 200 amperes). A second input, correction input, added to the set input in generator 38, receives the correction to be made to the current (between −50 and +50 amperes). Generator 38, in addition, can be controlled in all-or-nothing mode from PCU 28.

Figure 3:
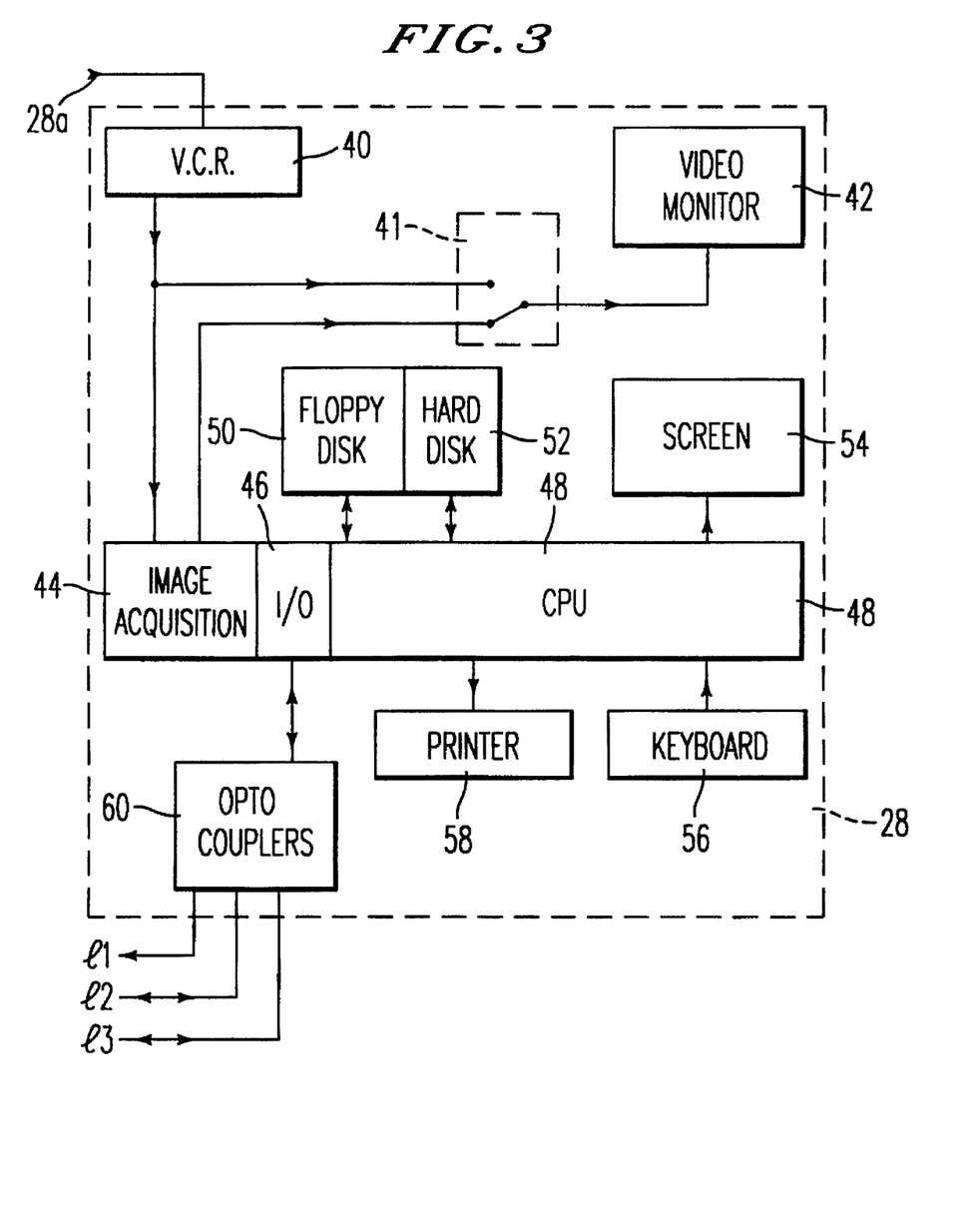
FIG. 3 represents diagrammatically the processing and control unit.

In FIG. 3, processing and control unit (PCU) 28 has been shown. At its input 28a, PCU 28 receives a signal coming from the welding head. This signal is a video signal coming from the camera of the welding head.

Actually, a picture-taking device (camera, filter, objective lens) is included in the welding head to make possible, on the one hand, a view from a distance of the welding scene which is taking place, and on the other hand, a determination, from the images obtained, of the observable welding parameters.

Thus, the video signal coming from the camera is processed in PCU 28.

PCU 28 comprises a video recorder 40 (or any other means of storing images), at the input of which the video signal arrives. The images are thus stored to make possible, optionally, a simulation of the process in the cases where it is not applied in real time during parametering phases of the algorithms of measurements.

Further, it comprises a video monitor 42, an image acquisition card 44, input/output (I/O) interface cards 46, all these cards being installed in a central processing unit 48 of a microcomputer. This central processing unit 48 (CPU) controls all sorts of ordinary peripherals of a computer, namely a floppy disk drive 50, a hard disk drive 52, a screen 54, a keyboard 56 and a printer 58.

Thus, the video signal, stored by the video recorder, is sent, continuously, to image acquisition card 44, which makes it possible to process said images constantly.

Monitor 42 makes it possible for the user to display the contents of image card 44, therefore in particular, the digitized image on which the processing is performed, as well as the values of the parameters determined by processing performed by the CPU on the image contained in said card 44.

According to an embodiment of the invention, monitor 42 is an analog color monitor. A "black and white" mode makes it possible to display the main image in black and white and to display the other pieces of information in various colorations depending on the type of information. A "pseudo-color" mode makes it possible to transpose the scale of grays, arbitrarily, into a scale of colors which makes possible a better observation of the image by the user.

Further, a switch 41 makes it possible, at the request of the user, to display on monitor 42 either the signal coming directly from video recorder 40, for checking and adjustment purposes, or the data coming from card 44.

According to an embodiment of the invention, image acquisition card 44 is a "frame grabber" card which is installed in central processing unit 48 of an AT standard industrial microcomputer.

The frame grabber card assures the transformation of an image in video signal (analog) form into a digitized image that it stores in a memory that can be accessed by the microcomputer for processing.

Central processing unit 48 is selected relatively powerful and fast (386 at 20 megahertz). It can thus perform all the processing in real time.

In this central processing unit 48, there are also installed interface cards 46 which assure the connections between central processing unit 48 and the other elements of the system, namely connections L1, L2, L3, with, respectively, welding head 32, welding bench 30 and welding generator 38. These cards comprise cards of analog outputs, of analog inputs and of digital inputs/outputs.

All the connections L1, L2, L3 coming from the interface cards are subjected to a disturbed environment due particularly to strong currents, and to the electric arc. To protect these connections L1, L2, L3 from this disturbed environment, said connections go through galvanic insulations 60 consisting, for example, of optocouplers or insulation amplifiers.

The overall operation is controlled by a specific software running on the CPU. A user (software) interface makes it possible for said user to control the entire system (i.e., the parametering, the operation, the execution and the accompanying functions of the system) by providing him with the necessary data.

The interactive dialog with the user occurs by means of commands of keyboard 56 and of the display on screen 54. On this screen 54, menus are displayed in which the user selects an option providing access to a new menu or a window. This window makes possible access to a certain number of parameters of the active program recorded in CPU 48 and described in the following description. These parameters can then be modified, with immediate effect.

Figure 4:
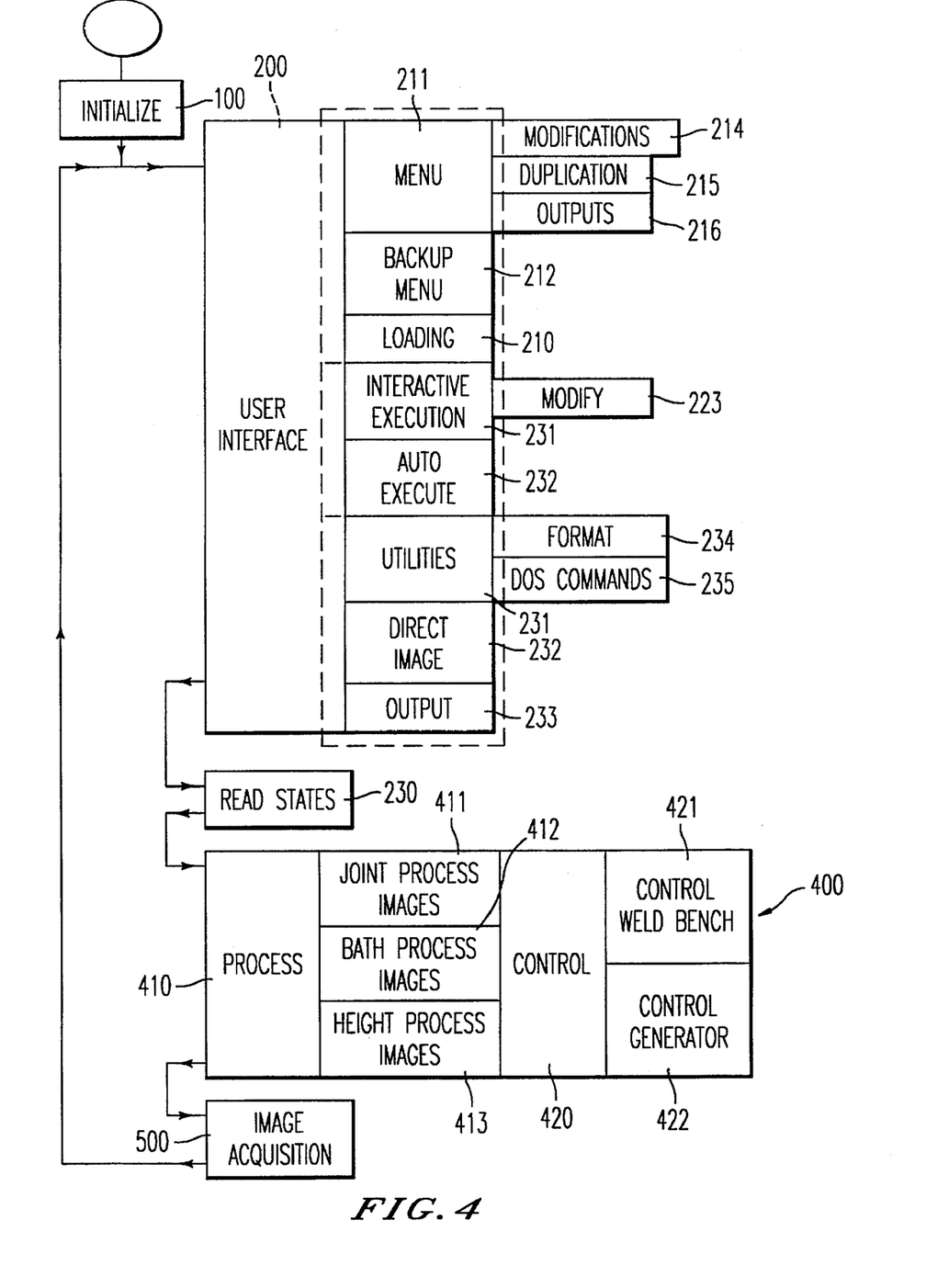
FIG. 4 represents, in a functional way, the process used by the processing and control unit.

The possibilities of choice, offered to the user thanks to this interface, are shown in greater detail in block 200 of FIG. 4. This figure represents, in a functional way, the process applied in the CAW system and used by a software package.

This software package can work with several control units (or programs) in memory, but, at a given instant, it works only on a single one.

Generally, the software assures the entire operation of the CAW system, the measurements by processing of images, the automatic controls in real time, the monitoring and control functions of the system, and the dialog interface with the user.

At the start of the process, there is a general initialization step at block 100. This initialization consists in the initialization of the software and of the parameters of the process at set values, i.e., at nominal values designed for nominal welding conditions.

The following step consists in continually making a loop through several tasks defined in blocks 200, 300, 400 and 500 and which, during the execution of a welding, is synchronized on a real time clock to operate at a constant speed.

Block 200, i.e., the first task performed by the software, consists of the user interface with the display of a general menu. This menu provides access to three groups of options:

a group 210 for working on the programs, with a menu 211 for editing providing access to modifications 214 of the parameters, to their duplication 215 in the various programs, and to their outputs 216 to printer 58; a backup menu 212 providing access to the operations for backing up the programs on disks or floppy disks; and a loading menu 213 providing access to the operations for loading into the CPU of the programs stored on hard disk or floppy disk;

a group 220 for execution in real time, with a menu 221 for interactive execution providing the possibility for the user to modify at 223 all the program parameters during the execution, with immediate effect; and a menu 222 for automatic execution that does not allow any modification by the user during the execution;

a group 230 for housekeeping operations of the system with a menu 231 for utilities making possible formatting 234 of the floppy disks and commands 235 of the computer system (for example, the DOS commands); a menu 232 for use of the interpreter making possible a direct interactive work on the image card, and; a direct output 233 of the software.

The second task of the software, block 300, consists in the reading of the states coming from the bench and from the welding generator, these states being updated at each cycle of the loop.

The third task of the software, block 400, consists in executing at 410 those of functions 411, 412, 413 for processing of images which are active, in processing measurements at 420, and in controlling optionally the welding bench and/or generator at 421 and 422. This task is executed in real time from processed images.

The image processing functions, cited above, are three in number, and relate to three measured pieces of information, namely the tracking of the joint, the width of the bath and the height of the welding head.

The three functions JOINT 411, BATH 412, and HEIGHT 413 are performed according to common characteristics:

the processing of images is performed only on the contents of a window of interest in the image being processed. This window has a simple geometric shape (rectangle), fixed orientation, completely programmable dimensions and position;

work is performed on the levels of grays of the pixels of the window. Their 2D (two-dimensional) distribution is transformed into a 1D profile along one of the axes of the window: a point of the profile has as its value the average of the window following the other axis (smoothing in one dimension of the window);

a specific search algorithm of a characteristic of the profile calculates the position of the searched characteristic in the window: this is the value of the corresponding measurement;

at the various stages of the processing, validity criteria are taken into consideration. Error conditions are flagged, and in case of errors on a programmable number of successive cycles of the software package, an alarm is triggered;

inside each processing window, additional markers are defined whose position is programmable. These markers relate to the axis of the window along which the gray profile is established.

The JOINT function has as its object to measure the position of the joint. This position can be determined by observation of the welding scene illuminated by the arc, or optionally by a spot, along the picture-taking angle. It works in a window parallel to the axes of the image, with determination of the profile crosswise to the welding axis. The joint appears normally as a darker line, in the welding axis (horizontal on the monitor), on a brighter background. The JOINT algorithm seeks a minimum value in the profile, with programmable criteria of contrast of the minimum relative to the background and to other possible minimums, and of width of the minimum. The position of the center of the validated minimum is the measurement result.

The BATH function has as its object to measure the width or the diameter of the bath from an observation made of the welding scene. It uses a window, of programmable type depending on the appearance of the image to be processed:

either a "straight" window parallel to the axes of the image, with determination of the profile crosswise to the welding axis;

or an "oblique" window, consisting in fact of two half-windows of equal dimensions, with a common apex (central "pivot pin"), and that are oriented at about + and −60° in relation to the welding axis. This oblique window in fact forms a V oriented toward the front of the bath and, well positioned, it makes it possible to work along two radii of the bath. The profile is determined along the two legs of the V, in continuity, and can be likened to a pseudo-diametral section of the bath.

Depending on the appearance of the image of the bath, there is available for the processing a programmable choice of three algorithms (in the embodiment described), all three come under an analysis of contrast by derivation of the gray profile of the window.

The simplest algorithm, known as "spot," can be used on images where the bath forms, on a dark background, a bright spot, quite homogeneous in the window, and with a good contrast on its edges.

The algorithm known as "spot 1" is applied to the same type of images as before, but makes it possible to process the case where the spot is not homogeneous in the window (increase or reduction of brightness at the center of the spot, in general due to the presence of the electrode tip).

These two algorithms are generally used on hollow baths, i.e., for a welding without wire filler.

The algorithm known as "wave" is used on images where the bath appears in the form of a non-homogeneous and bright central spot, surrounded by a dark (indeed black) border, itself surrounded by a bright and relatively narrow reflection, all on a dark background.

This algorithm is used essentially on "crown" baths, i.e., for a welding with wire filler.

The HEIGHT function has as its object to measure the height of the welding head above the impact points of the spots, by a triangulation method. Taking into account the geometric disposition of the head, a variation in height is reflected on the image by a displacement of the spot parallel to the welding axis.

The HEIGHT function uses one window per height spot, or three windows, parallel to the axes of the image. The processing is the same for the three windows and it is performed successively on the first, the first two or the three windows, depending on the value of a programmable parameter of each program.

The profile is determined parallel to the welding axis and a processing algorithm determines the position of the center of the spot, or optionally, for a readjustment for example, the position of a transition from dark to bright or from bright to dark.

According to another embodiment of the invention, a beam separator associated with the picture-taking camera is used to measure the height. This beam separator makes it possible, from the observation of the projected spots, to form the image of the welding scene in a measuring chamber, in which one or two linear position detectors of the spots (standard PSD, Position Sensing Device, component) are installed.

From these functions, measurements are processed in block 420.

From these measurements, and as a function of the set values, the execution of automatic control functions 421 and 422 of outside elements is used. The execution of these functions is reflected by commands of movements of the welding bench and commands of process parameters, and more specifically, commands of the welding current provided by the generator.

Actually, the movement commands are characterized by a speed command, proportional to the difference between the measurement and the set value. This type of command is associated with:

the JOINT function, to assure the joint tracking function. The set value of the measuring window is then set at the location where it is desired to maintain the joint. The difference in the joint window is multiplied by a programmable gain and sent by one of the outputs of the crosswise movement means of the bench. In case of error in the measurement, or of a measurement found outside the limits, a zero speed command is immediately sent which leaves the movement as is;

the HEIGHT function, in the sole case where it is desired to make a height adjustment independently of the command by arc voltage. This can be the case, in the absence of arc, for an approach or observation phase by the camera. The operation is then identical with the case of the joint, but vertical, and obviously subject to having set the set value or values of the window or windows used in a position corresponding to the desired height.

Moreover, the commands of process parameters are characterized by the automatic control of a magnitude equivalent to a position, i.e., typically by a PID command (a triple action command: proportional, integral, derivative) from a difference relative to a set value.

In the embodiment described here, it is essentially to control the current of the generator to control the penetration either from the measurement of bath width, or from the measurement of head height with adjustment of arc voltage. The control of the current of the generator is separated into two channels: one so-called set value channel and one so-called correction channel. The set value can be programmed for each program, and freshly supplied in output at each cycle of the software package in execution mode.

The automatic control of the welding current can be associated with:

the BATH function, in case of automatic control based on the bath width. The measured width is then compared with a programmable width set value and the difference is sent to an algorithm producing the PID correction, optionally completed by a reduction of the noise on the term derived by a programmable smoothing. The three gains P, I and D are also programmable. The calculated correction is then sent to the analog correction input of the generator and added to the set value input in the generator. In case of specific error, the previously established correction is kept, it is only in case of accumulated errors, causing an alarm, that the correction is brought back to zero, thus returning to the base set value current;

the HEIGHT function, in case of automatic control based on the crown, with height controlled by the adjustment of arc voltage. The height measured with a spot, or averaged on a measurement with two spots, is compared with a programmable crown set value and the processing is identical to the case of the automatic control by the bath width.

In addition to the execution of these functions of image processing and of automatic control of outside elements, the software also manages sequencing functions of the checking/command type. The latter functions comprise commands for starting/stopping the bench and the welding generator as well as the execution chaining of the programs which is controlled by programmable parameters (choice of the type of end of program, choice of the next program to be executed) and by direct commands of the user (from the keyboard).

Finally, the fourth and final task of the software, block 500, consists in starting the acquisition of an image by the image card. This task is executed only in continuous picture-taking mode. Actually, in shot-by-shot mode, the processed image is fixed and kept in the memory of the card and the acquisition of a new image is requested by the user during the first task.

The invention has been described above in the particular case of TIG welding. Nevertheless, it can be applied to numerous types of welding (laser welding, plasma welding, etc.) and to other processing of metals involving a melting bath, such as build-up welding.

We claim:

1. An automatic welding process in which welding parameters are processed that vary during an execution of welding, comprising:

establishing a first stage of relationships by establishing at least one data base from triplets of parameters wherein each triplet comprises a measured parameter, a controllable parameter, and a result parameter, and further wherein aid data base is constructed from data acquired during a prior welding operation between said welding parameters and storing these relationships, the first step of establishing said stages of relationship comprising establishing three data bases:

a static data base comprising, for each of the measured parameters, values obtained for the controllable parameters and the result parameters under established conditions;

a dynamic data base comprising values of the measured parameters and the result parameters during temporary variations of the controllable parameters; and a disturbed data base comprising values of the result parameters obtained from the measured parameters and the control parameters in the presence of a disturbance to be treated; and a second stage wherein said second stage comprises the steps of
   a) employing a CCD imager to take visible image pictures of a welding scene in progress including a frontal portion of said welding scene by use of light produced by said welding scene;
   b) analyzing said visible image picture-taking to measure the welding parameters affecting the relationships;
   c) evaluating from these measurements and from said relationships, the correction values to be made to the welding parameters; and
   d) intervening, as a function of said correction values, on the welding in progress.

2. A process according to claim 1, further comprising the step of between operations (a) and (b), creating a dialog operation with a user for assuring a choice of automatic execution or of interactive execution of operations (b) to (d).

3. A process according to claim 1, wherein the operations constituting the second stage are continually repeated as long as an interrupt order has not been received.

4. A process according to claim 3, wherein the interrupt order is given by a user during an interactive dialog operation.

5. A process according to claim 1, wherein picture-taking operation (a) is followed by a storing of said visible image picture taking.

6. A process according to claim 1, wherein said first and second stages of relationships comprise relationships between a measured parameter with a result parameter.

7. A process according to claim 6, wherein said first and second stages of relationships comprise connecting a relationships between a result parameter with a controllable parameter, correcting each result parameter subject to an appropriate constant value of the controllable parameter from the determination of the measured parameter.

8. A process according to claim 1, wherein said first and second stages of relationships comprise relationships between a result parameter and a controllable parameter.

9. A process according to claim 1, wherein stages of relationships between parameters comprise a relationship describing a width of a welding bath.

10. A process according to claim 1, wherein stages of relationships between parameters comprise a relationship describing a contour of the welding bath.

11. A process as in claim 1 further comprising performing said welding operation in a melting bath.

12. An automatic welding system comprising:

a welding head;

a welding carrier to which the welding head is fastened;

means for supplying the head with electricity; and a processing and control unit connected to the welding head and to the carrier, wherein, the welding head further comprises means for taking visible image pictures of the welding scene and for detecting at least one of a profile and a width of a welding bath using only light produced from said welding scene, the welding carrier being configured to be moved relative to the welding scene, and the processing and control unit comprising, a central processing unit means for analyzing the pictures, and means for controlling a power supply means and the welding carrier.

13. A welding system according to claim 12, wherein the processing and control unit further comprises means for displaying images and means for storing said images, located upstream from the analysis means.

14. A welding machine according to claim 13, wherein the means for analyzing the images of the welding scene comprises an image acquisition card installed in the central processing unit (CPU), this card being connected to the means for displaying images and to the means for storing images.

15. A welding machine according to claim 12, wherein the central processing unit comprises:

input/output interface cards able to establish connections between the CPU and the welding carrier, between the CPU and the power supply means and between the CPU and the welding head.

16. A welding machine according to claim 12, wherein the electric power supply means comprises a welding generator generating a welding current that can be controlled from the outside by at least one electric signal.

17. A welding machine according to claim 16, wherein it further comprises means for regulating an arc voltage that is connected, at input, to the welding head, and, at output, to the welding carrier.

* * * * *